US010970342B2

(12) United States Patent
Hagopian et al.

(10) Patent No.: US 10,970,342 B2
(45) Date of Patent: *Apr. 6, 2021

(54) METHOD AND SYSTEM FOR ENABLING REAL-TIME, COLLABORATIVE GENERATION OF DOCUMENTS HAVING OVERLAPPING SUBJECT MATTER

(71) Applicant: Bulletin Intelligence LLC, Reston, VA (US)

(72) Inventors: Matthew Hagopian, McLean, VA (US); Greg Dietz, Dulles, VA (US); Michael Hogue, Fairfax, VA (US)

(73) Assignee: Bulletin Intelligence LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/287,913

(22) Filed: Oct. 7, 2016

(65) Prior Publication Data

US 2017/0024481 A1 Jan. 26, 2017

Related U.S. Application Data

(63) Continuation of application No. 13/923,356, filed on Jun. 20, 2013, now Pat. No. 9,465,784.

(51) Int. Cl.
*G06F 16/9535* (2019.01)
*G06F 16/93* (2019.01)
(Continued)

(52) U.S. Cl.
CPC .......... *G06F 16/9535* (2019.01); *G06F 16/93* (2019.01); *G06F 40/131* (2020.01);
(Continued)

(58) Field of Classification Search
None
See application file for complete search history.

(56) References Cited

U.S. PATENT DOCUMENTS 6,687,878 B1   2/2004  Eintracht
7,103,838 B1 * 9/2006  Krishnamurthy ... G06F 17/2211
                                      707/999.1
(Continued)

FOREIGN PATENT DOCUMENTS

WO   WO 2013/017038 A1   2/2013

OTHER PUBLICATIONS

Bier, Eric A. et al., "MMM: A User Interface Architecture for Shared Editors on a Single Screen," Proceedings of the 4th Annual ACM Symposium on User Interface Software and Technology, pp. 79-86, Nov. 11-13, 1991.

(Continued)

*Primary Examiner* — Christopher J Raab
(74) *Attorney, Agent, or Firm* — Jones Day

(57) ABSTRACT

A method and system is described that enable a plurality of co-authors to generate and edit work product to be incorporated into different documents customized to suit the interests of different audiences. A first user authors a text passage that pertains to a certain subject matter, intending to use this passage in a particular document. The passage is made available over a network to other users who may wish to include the text passage or a derivative thereof in another document being authored. A second user may link to the text passage to incorporate it into another document. When that occurs, changes that either the first user or a copy editor, as a third user, makes to the passage can be made simultaneously in the other document being generated by the other user. If instead, the second user wishes to edit the text passage, the link can be broken and a derivative text passage can be created for inclusion in that second user's document.

19 Claims, 10 Drawing Sheets

(51) Int. Cl.
*G06F 40/131* (2020.01)
*G06F 40/166* (2020.01)
*G06F 40/169* (2020.01)
*G06F 40/197* (2020.01)

(52) U.S. Cl.
CPC .......... *G06F 40/166* (2020.01); *G06F 40/169* (2020.01); *G06F 40/197* (2020.01)

(56) References Cited

U.S. PATENT DOCUMENTS

| | | | |
|---|---|---|---|
| 7,249,314 B2 | 7/2007 | Walker | |
| 7,937,663 B2 | 5/2011 | Parker | |
| 8,196,029 B1 | 6/2012 | Rucker | |
| 8,434,002 B1 | 4/2013 | Shah | |
| 2006/0041589 A1* | 2/2006 | Helfman | G06F 17/3089 |
| 2006/0212792 A1* | 9/2006 | White | G06F 16/958 |
| | | | 715/205 |
| 2006/0277481 A1* | 12/2006 | Forstall | G06F 17/30899 |
| | | | 715/764 |
| 2007/0033154 A1* | 2/2007 | Trainum | G06F 16/93 |
| 2007/0061296 A1 | 3/2007 | Burke | |
| 2008/0235569 A1* | 9/2008 | Arun | G06F 17/2288 |
| | | | 715/229 |
| 2009/0125518 A1 | 5/2009 | Bailor | |
| 2009/0157572 A1 | 6/2009 | Chidlovskii | |
| 2009/0171987 A1 | 7/2009 | Coppinger | |
| 2009/0249224 A1 | 10/2009 | Davis | |
| 2010/0228794 A1 | 9/2010 | Roy | |
| 2011/0046983 A1 | 2/2011 | Soble | |
| 2011/0066966 A1* | 3/2011 | Worrall | G06F 17/211 |
| | | | 715/776 |
| 2011/0107192 A1* | 5/2011 | Ge | A61K 31/12 |
| | | | 715/202 |
| 2012/0060082 A1 | 3/2012 | Edala | |
| 2012/0192064 A1* | 7/2012 | Antebi | G06Q 10/10 |
| | | | 715/255 |
| 2012/0233543 A1 | 9/2012 | Vagell | |
| 2012/0284605 A1 | 11/2012 | Sitrick | |
| 2014/0173426 A1* | 6/2014 | Huang | G06F 17/2705 |
| | | | 715/256 |
| 2014/0279893 A1 | 9/2014 | Branton | |
| 2014/0281875 A1 | 9/2014 | Branton | |

OTHER PUBLICATIONS

Ter Hofte, G. H. et al., "CoCoDoc: A Framework for Collaborative Compound Document Editing Based On OpenDoc And CORBA," Proceedings of IFIP/IEEE International Conference on Open Distributed Processing And Distributed Platforms, pp. 15-33, May 26-30, 1997.

* cited by examiner

US 10,970,342 B2

1

METHOD AND SYSTEM FOR ENABLING REAL-TIME, COLLABORATIVE GENERATION OF DOCUMENTS HAVING OVERLAPPING SUBJECT MATTER

CROSS REFERENCE RELATED APPLICATION

This application is a continuation of U.S. patent application Ser. No. 13/923,356, filed on Jun. 20, 2013, and titled "Method And System For Enabling Real-Time, Collaborative Generation Of Documents Having Overlapping Subject Matter," now allowed, which is hereby incorporated by reference in its entirety for all purposes.

TECHNICAL FIELD

The present disclosure relates to a system and method for enabling real-time, collaborative generation of documents having overlapping subject matter. For example, the following discloses a technique for collaboratively authoring and editing work product to be incorporated into documents customized to suit the interests of different audiences.

BACKGROUND OF THE INVENTION

In many circumstances, it is advantageous to author documents using a collaborative approach. For example, in the newspaper industry, different reporters work on different stories that are to be incorporated into the same newspaper, and often, two or more reporters co-write a story (or "column") or that newspaper. In the software industry, code developers typically apportion the code into sections (e.g., modules, functions, or routines) and then assign responsibility to different programmers (either individually or in groups) to prepare those sections. Indeed, in any industry where documents are prepared, whether the documentation is lengthy (e.g, textbooks, journal articles, or technical specifications) or concise (e.g., marketing brochures, contracts, or business proposals), multiple authors are tasked with working collaboratively to generate and edit the work product.

Documentation prepared in a word processing file can be saved locally on a personal computer or on a networked document management system. Conventionally, when a document is being prepared by a plurality of co-authors, one writer works on the draft at a time. The document may be "passed along" from one co-author to the next, or alternatively, different co-authors may author different sections of a draft and send them to another co-author for integration into a master word processing file.

Recently, software applications have been developed to facilitate collaborative editing of a document. Some applications enable more than one user to type text into a document at the same time. Some of these "real time collaborative editing" programs include "rules" for resolving conflicts that might otherwise result when, for example, users are editing the same sentence at the same time. Other programs avoid conflicts by using a central server to store documents in a repository and enable different users to "check-in" and "check-out" of the document to make changes and then make the document available to other users. To improve efficiency, some of these "non-real time collaborative editing" programs send indications to alert co-authors as to when a document has been "checked-out" or "checked back in," and others enable a designated "master user" accept or decline edits proposed by other users.

2

Known collaborative editing software applications are generally intended for co-authoring a single document. Basically, collaborative editing software can enable co-authors to edit a document without having to physically mark-up a printed copy and pass the draft along from one author to the next.

SUMMARY

A method and system is described that enables a plurality of co-authors to generate and edit work product to be incorporated into different documents customized to suit the interests of different audiences. A first user authors a text passage that pertains to a certain subject matter, intending to use this passage in a particular document. The passage is made available over a network to other users who may wish to include the text passage or a derivative thereof in another document being authored. A second user may link to the text passage to incorporate it into another document. When that occurs, changes that either the first user or a copy editor, as a third user, makes to the passage can be made simultaneously in the other document being generated by the other user. If instead, the second user wishes to edit the text passage, the link can be broken and a derivative text passage can be created for inclusion in that second user's document. The derivative text passage can remain affiliated with the original text passage to facilitate tracking and further editing of either passage by any user. Any metadata, citations, weblinks, attachments, or other data that is associated with the original text passage also can be automatically associated with the derivative text passage.

In an embodiment of the present invention, a system is disclosed for collaborative generation of a plurality of customized documents, each comprising a plurality of text passages. The system includes a server connected to a network for maintaining storage of a plurality of text passages in a database. At least one networked client computer is also included, which is in communication with the server and configured to receive user input from an author for generating a document. The networked client computer is also for generating new text passages and selecting already-generated text passages authored by others. The new and selected text passages are to be included or modified for inclusion together in the document. Different authors are responsible for generating different documents. The server is configured such that, when a new text passage is generated for a document, the server stores the new text passage in the database and creates a link of a first type between the new text passage and the document. Additionally, when an already-generated text passage is selected for a document, the server creates a link of a second type between the selected text passage and the document.

In an embodiment of the present invention, a method is also disclosed for collaboratively generating a plurality of customized documents, each comprising a plurality of text passages. According to the method, storage of a plurality of text passages is maintained in a database to be linked for inclusion or modified for inclusion in at least one document. In response to user input to generate a new text passage, the new text passage is stored in the database and a link of a first type between the authored text passage and the document is created. In response to user input to select an already-stored text passage, a link of a second type between the selected text passage and the document is created.

In yet another embodiment of the present invention, a method is described for collaboratively generating a plurality of customized documents, each comprising a plurality of text passages. According to the method, text passages are received over a network to be stored and linked for inclusion in documents being generated by respective authors. For each text passage received, an owner link is created between the text passages and the corresponding documents being generated. In response to user input, stored text passages for which owner links have been created are selected, and copy links are created between the selected text passages and the corresponding documents being generated.

BRIEF DESCRIPTION OF THE DRAWINGS

Further features of the invention, its nature and various advantages, will be apparent upon consideration of the following detailed description, taken in conjunction with the accompanying drawings, in which the same reference numbers or letters refer to the same elements throughout.

DETAILED DESCRIPTION

Embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope. Embodiments may be practiced as methods, systems or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as interconnected machine modules within the computing system and/or (2) as a sequence of computer implemented steps running on a computing system. The implementation is a matter of choice dependent on the performance requirements of the computing system implementing the invention. Accordingly, the logical operations making up the embodiments described herein are referred to alternatively as operations, steps or modules.

Aspects of the disclosure pertain to a computer system and method of using the computer system to generate a plurality of different documents that are customized to suit the interests of different audiences. There are several potential applications for this technology, and the scope of this disclosure is not intended to be limited to any certain types of documents or any particular business concern.

In one exemplary embodiment, the inventive technique can be used for generating customized news summaries for clients. In this example, clients contract to receive a daily report that contains, in a condensed fashion, briefing summaries of news articles and events that are believed to pertain to the client's business concern or industry. For example, a corporate executive at a multi-national electronics company will be interested in receiving summaries of news articles pertaining to the company and its products, competitors in that industry, and any political, legislative or judicial happenings that could affect the company. A second corporate executive at a rival multi-national electronics company will be interested in receiving much of the same information, but understandably, with an emphasis on the second corporate executive's own company and products. In contrast, a high-ranking military officer is more likely to be interested to receive news summaries concerning foreign military escalations, government appropriations, political commentary concerning the armed forces, etc.

Exemplary Operating Environment

Figure 1:
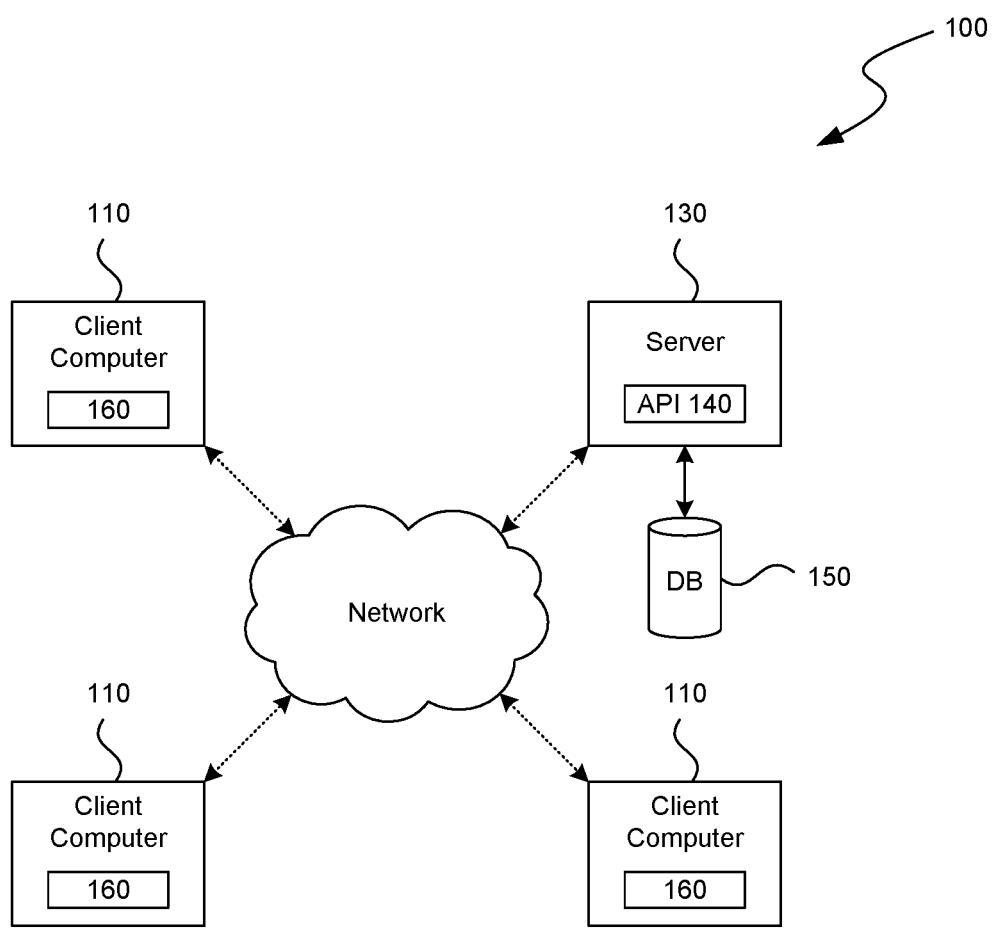
FIG. 1 is an exemplary diagram of a system for implementing an embodiment of the invention.

FIG. 1 is a diagram of an exemplary system (100) in which concepts consistent with the principles of the invention may be implemented. System (100) include at least one client computer (110), and preferably, more than one client computer (110) as shown, that can connect to one or more servers via a network to server (130). The network may be or include, alone or in conjunction, an intranet, the Internet, a local area network (LAN), a wide area network (WAN), or others. Any number or combination of servers and clients may be used. In some aspects, a client and server may perform functions of the other.

Client computers (110) include a computing device to creating works of authorship or edits thereto, such as a personal computer (such as a desktop or laptop), tablet, a smart phone, a personal digital assistant (PDA), or other type of computer or communication device. Users of client computers (110) may be authors, proofers, or editors, and may access or receive information from server (130) over the network. The client computers (110) may include typical components, such as a processor, memory, a storage device, an input device, an output device, and a communication interface.

As shown in FIG. 1, client computers (110) generally interact with server (130) such that the client computers (110), in conjunction with server (130), execute a collaborative, customized document generator application. Server (130) may include software, such as an API, or application program interface (140), for implementing the application. Text passages and documents created by users of client computers (110) may be stored by server (130) in, for example, one or more databases (150). Although illustrated as a single device in FIG. 1, the server may be implemented as, for example, a single computing device or as multiple distributed computing devices. One of ordinary skill in the art will appreciate that whether a device is functioning as a server or a client often depends on the specific application being implemented and the client-server relationship.

The interaction of client computers (110) with server (130) may be through a client application program 160, such as installed software or a browser running on client computers (110). It is possible that different client computers (110) will run different client application programs 160 depending upon the type of computer or operating system (e.g., Windows or Macintosh OS) or the level or type of access needed (e.g., a co-author may need a different level of access than a document editor). If the application program runs and is displayed within a browser 115, then the client computers (110) may not need to install special software to use the system. When browsers or browser programs are discussed herein, these terms are intended to refer to any program that allows a user to browse markup documents (e.g., web documents), regardless of whether the browser program is a standalone program or an embedded program, such as a browser program included as part of an operating system.

It is also possible to run the collaborative, customized document generator application as a distributed application across one or more servers (130) and one or more client computers (110). Additionally, the API (140) may implemented in software and stored in a computer-readable medium, and include other components, not shown, including, a front-end component that interfaces with client computers (110), and a back-end component for processing presentation features as well as supporting the collaborative document updating further described herein.

Generating Collaborative, Customized Documents

Figure 2:
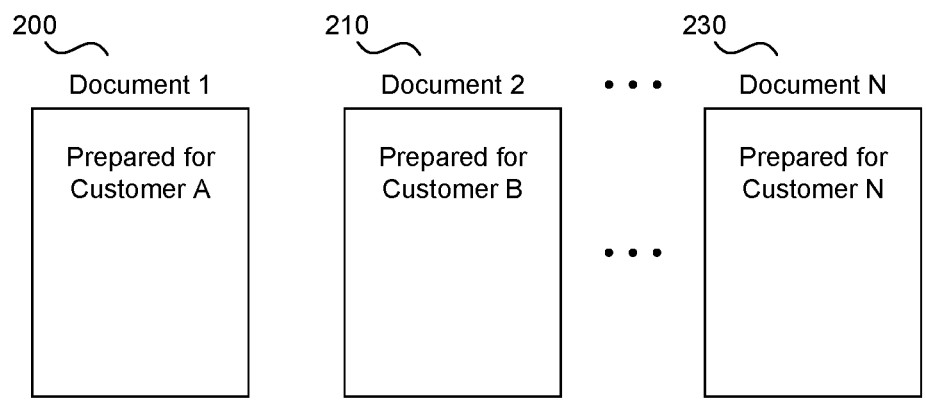
FIG. 2 is an exemplary illustration of customized documentation that can be generated in accordance with embodiments of the present invention.

FIG. 2 is an exemplary illustration of customized documentation that can be generated in accordance with embodiments of the present invention. In this illustration, at least three (3) documents are generated (shown as "Document 1, Document 2, . . . Document N, represented by 200, 210 and 230, respectively), each of which is custom-prepared for a customer, client, or matter (represented in the figure as CUSTOMER A, CUSTOMER B, . . . CUSTOMER N). As one example, each document can be a news briefing specially prepared for a different business executive, corporate department, military officer, or politician. As other examples, the different documents can be customized contracts or agreements, business proposals, or presentations. In yet another example, each document might be for the same customer/client, but for a different matter (such as different contracts, each custom-drafted to account for the particular provisions for each agreement).

Although in these examples, each document is substantively different from a document prepared for another customer/client/matter, in some embodiments, there may be some overlap in the substantive content between some of the documents. For example, in a set of sales agreements (whether for the same client or for different clients), many are likely to have the same or similar warranty provisions. In accordance with embodiments of the present invention, a plurality of co-authors collaboratively prepare the documents by preparing text passages that may be incorporated, with or without further edits or customizations, into more than one document.

Figure 3:
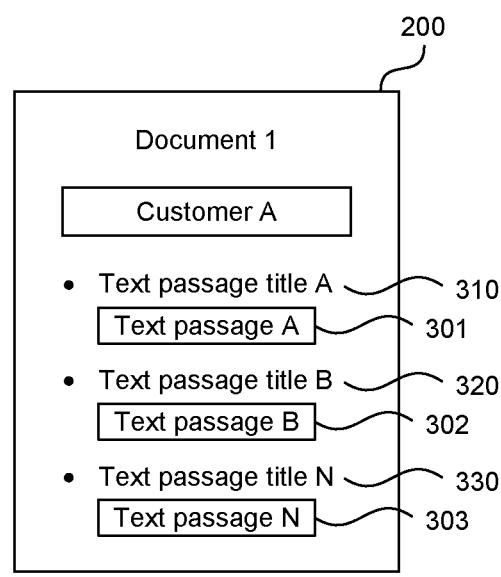
FIG. 3 is an exemplary illustration of text passages to be included in a customized document generated in accordance with embodiments of the present invention.

FIG. 3 illustrates content that may be included in Document 1 (200), prepared for Customer A, from FIG. 2. The customized document can include a number of different text passages (301, 302, 303). As one example, the document may be a news briefing, in which each text passage is a summary of a different news event. As another example, the document may be a contractual agreement in which a text passage is a contractual provision. Optionally, each text passage may have its own text passage title. As can be seen in FIG. 3, in Document 1 (200), text passage titles (310), (320), (330) are included as titles to text passages A (301), B (302) and N (303), respectively. In other embodiments, text passages that are closely related to each other may share the same text passage title. It is also possible to generate a document with no text passage titles at all.

In an embodiment of the invention, text passages can be logically organized and presented in a document by grouping them together where possible according to their subject matter. For example, with further reference to FIG. 3, text passages A and B may concern the same general topic or might be otherwise substantially related (or, as another example, the two passages might cross-reference each other). Continuing with this example, text passage N (and other text passages not illustrated in the exemplary document of FIG. 3) may concern a different topic or otherwise may be unrelated to text passages A and B. Accordingly, the document can be organized into sections, where related text passages can be grouped together in a section.

For example, a contract for the provision of goods or services may be organized into at least the following different sections: (i) provisions concerning the name, location and state of incorporation for the parties who will be legally bound to the agreement, (ii) provisions explaining the tasks to be performed, goods to be manufactured, sold, purchased, etc., by the parties, (iii) provisions governing the money or other consideration to be paid, (iv) provisions for the term (duration) of the agreement, and opportunities to cancel or renew for another term, and (v) warranty and indemnification provisions. Returning to FIG. 3, if, for example, text passage A (301) pertains to an agreed-upon initial term of the agreement, and text passage B (302) pertains to the parties' agreement about circumstances that warrant each side to cancel the agreement, these two text passages may be combined into a single section. Within the section, different text passage titles (310) and (320) can easily distinguish the different contractual provisions provided in the different text passages.

A news briefing is another type of document that can be organized into a plurality of sections. Sections in a customized news briefing for a corporate executive, for example, might include (i) mentions of the company (or the corporate executive) in the news, (ii) outlook on financial markets relevant to the company, (iii) competitive intelligence concerning rival companies or recognized competitors, and (iv) political happenings, judicial decisions, and/or proposed legislation that may be relevant to the company. Returning once again to FIG. 3, if, for example, text passage A (301) pertains to one news event mentioning the company and text passage B (302) pertains to different news event that also mentions the company, these two text passages may be combined into a single section, where text passage titles (310) and (320) distinguish between the news events. In this example, each text passage (A, B, ... N) can be a different "story," which may be a summary of the news event.

Figure 4:
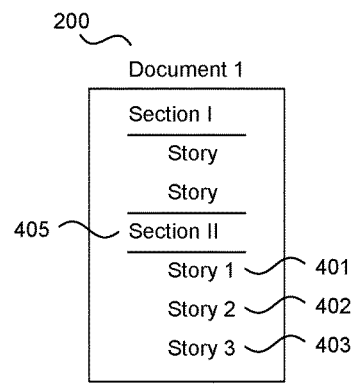
FIG. 4 is an exemplary illustration of organization of stories that can be included in a customized document generated in accordance with embodiments of the present invention.

FIG. 4 is an exemplary illustration of a customized document generated in accordance with embodiments of the present invention. In this figure, a plurality of text passages, referred to here as "stories," are grouped into different sections. In this manner, the document is organized as a tree, such that the reader can easily understand the relevance of different stories according to the section in which each appears.

In FIG. 4, Document 1 (200), which is being generated for Customer A, includes two sections, SECTION I and SECTION II (405), each of which in turn includes a plurality of stories (or text passages). Particularly, in this example, SECTION II includes three stories, STORY 1 (401), STORY 2 (402) and STORY 3 (403). Continuing with the example of a customized news briefing, STORIES 1, 2 and 3 can be different text passages that are relevant to the topic in SECTION II. If, for example, SECTION II concerns "competitive intelligence," then STORY 1 might concern articles about a change in management for one of Customer A's rival companies, STORY 2 might pertain to newspaper articles about the rival company's newly introduced product, and STORY 3 might concern a third company that has announced that it is developing a different product that Customer A also sells.

Some of the stories (text passages) in FIG. 4 may be relevant for other customers/clients/matters as well. As one example, if Customer B is also a rival company with Customer A, then Customer B might also be interested in one or more of the stories that are being prepared in Document 1. As another example, if one were to provide news briefings to multiple U.S. congressmen, all of them might want to be informed about developments in the presidential election, although perhaps only some might wish to be kept up to date on the escalating war in a foreign country.

Once an author who is responsible for a document identifies a story that had been written for another document as being relevant, the author may wish to copy the story verbatim or prepare edits to customize it. The author may decide, for example, to add more text to the story, edit the story, or edit its title (text passage title). Assuming that different persons are responsible for preparing the two documents, it would be advantageous to facilitate collaboration so as to avoid duplicative effort in creating text passages in the documents that have substantially related subject matter.

Figure 5:
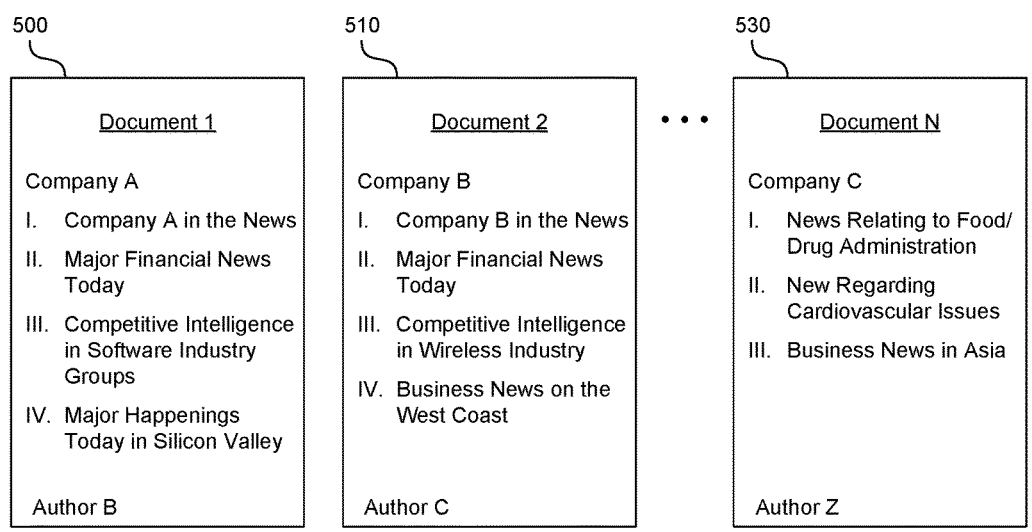
FIG. 5 is an exemplary illustration of a plurality of customized documents that can be generated in accordance with embodiments of the present invention.

FIG. 5 is an exemplary illustration of different sections that may be incorporated into different customized documentation generated in accordance with embodiments of the present invention. In this example, documents (500, 510, 530) are divided into a plurality of sections. For each section included in a document, an author for that document (or a plurality of authors responsible for that document) will add one or more text passages (or stories) that logically correspond to that section. As described above, text passages (or stories) that an author for one document has written for inclusion in a section of that author's document might also be useful for another document. If two different documents happen to include the same or similar section, it might be (but is not necessarily) likely that a text passage for inclusion in one document is also useful for another one.

As can be seen in the example provided in FIG. 5, custom-prepared Document 1 (500) includes Section I ("Company A in the News"), Section II ("Major U.S. Financial News Today"), Section III ("Competitive Intelligence In the Software Gaming Industry"), and Section IV ("Major Happenings Today In Silicon Valley"). Document 2 (510) is also divided into four sections. Document 2 includes Section I ("Company B in the News"), Section II ("Major U.S. Financial News Today"), Section III ("Competitive Intelligence in the Wireless Industry"), and Section IV ("Business News in the West Coast"). Of course, many sections, and the stories that will be included in them, are unique to that customer. But other sections, such as "Major Financial News Today," might be included in different documents for different customers. And some sections, such as "Major Happenings Today In Silicon Valley" and "Business News on the West Coast," might pertain to some overlapping subject matter, such that there might be stories that are relevant to both.

Considering the example for Documents 1 and 2 in FIG. 5, Author B, who is responsible for Document 1, might have written a story for Customer A, to be included in the section "Major Happenings Today In Silicon Valley" that might also be relevant to Customer B, and could be included in the section titled "Business News in the West Coast." If Author C were apprised of this, Author C might want to obtain a copy of that story, either to incorporate it directly into Document 2 or perhaps to modify that story to be customized for Customer B. As will now be described, the inventive technique enables Author B and Author C to collaborate, or at least coordinate efforts remotely using automated tools.

Figure 6A:
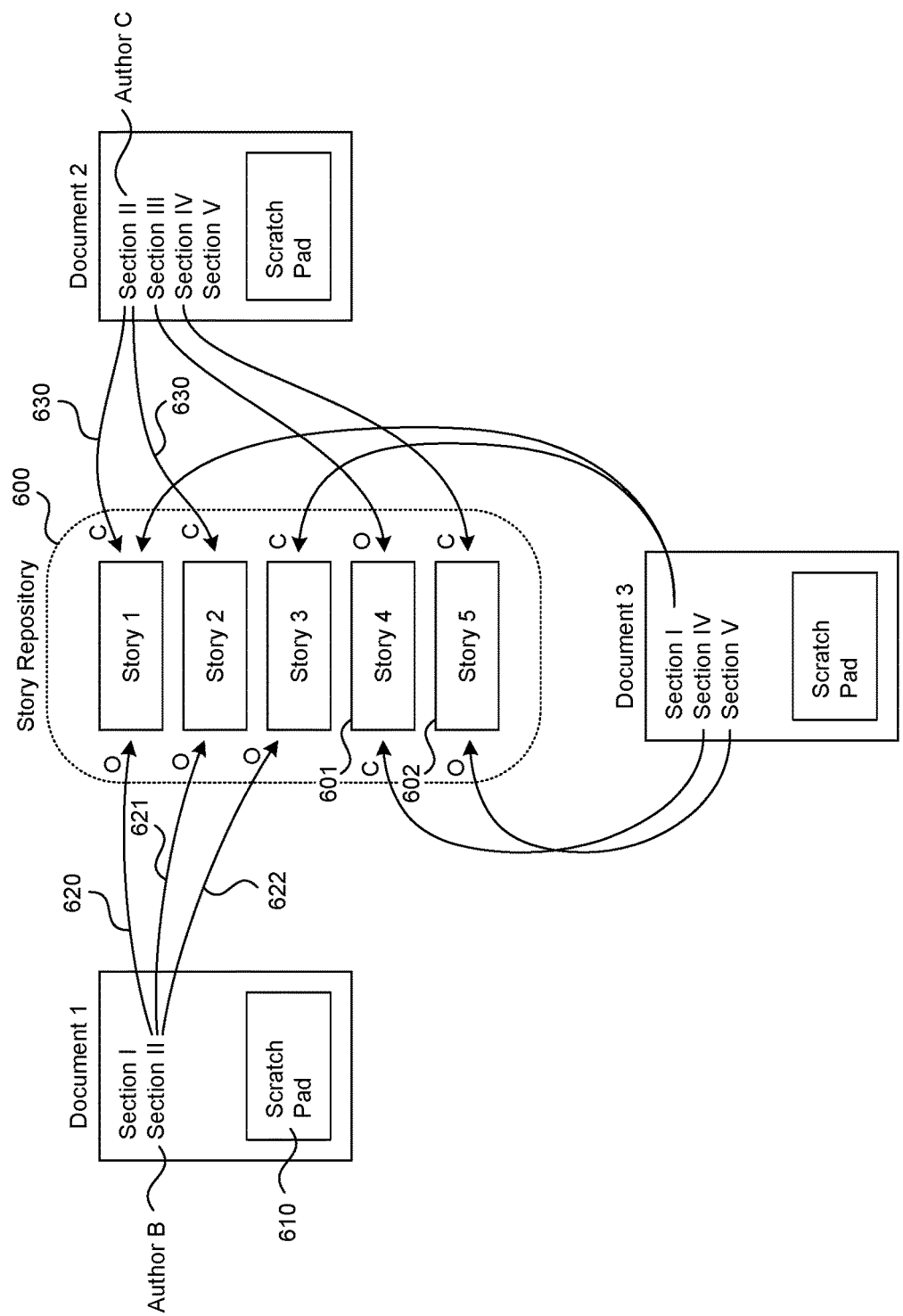
FIG. 6A is an exemplary diagram of links between text passages and customized documents in accordance with embodiments of the present invention.

FIG. 6A is an block diagram illustrating a plurality of links made between electronic documents in accordance with embodiments of the present invention. In this example, each author who is responsible for generating customized documents prepares stories (or text passages) to be included in that author's respective document, and those stories are stored centrally in a Story Repository (600). Accordingly, the Story Repository includes a plurality of stories written by different authors for different documents. In accordance with an embodiment of the invention, at least one story is "linked" to more than one document. In this manner, a story that is useful for multiple documents can be included in each of those documents. This creates efficiencies by avoiding duplicative efforts that might otherwise occur if authors of different documents each unknowingly prepared the same story.

In FIG. 6A, Documents 1 (200), 2 (210) and N (230) are illustrated, along with Story Repository (600). Story Repository (600) is located in database (140) and is controlled by API (140) in server (130). Authors operating client computers (110) run application 160 via a network to store stories (text passages) via API (140) into database (150). Documents that incorporate the stories (text passages) are also stored in database (140), as controlled by API (140).

In the illustrated embodiment, authors of documents prepare "stories" in a Scratch Pad (610) included in client application (160). As its name implies, the "Scratch Pad" is available for an author to draft and edit stories (text passages) intended for inclusion in a document. Once a story is ready for others to see, it is "promoted" from the Scratch Pad into the Story Repository (600).

For example, in FIG. 6A, Author B has access to Scratch Pad 610. Author B might download a small grouping of news articles relating to a management change at a company known to be a rival of Author B's customer. Author B might create a story (text passage) that selectively quotes from one or more of the articles as part of a brief summary about the news event. The text passage also might explain which newspaper first "broke" the story and how the treatment about the management "shakeup" differed from one newspaper to the next. Of course, since Author B is preparing the story for a particular client, the author will use a format or writing style known to be liked by that client, who will receive Document 1.

Once Author B completes the draft of a text passage, he can then "promote" the passage as a "story" to be included in the Story Repository (600). For example, in FIG. 6A, Author B has promoted 3 stories, STORY 1 (501), STORY 2 (502) and STORY 3 (503). By promoting these stories, they are the stored in the Story Repository and Author B then has a link to the stories, as shown in elements (620), (621), and (622). Since Author B drafted these stories, the link indicates that Author B is the "owner" ("O") for the link.

Since, as described above, Author C is also interested in STORY 1 (501) and STORY 2 (502), but not STORY 3, another link can be made to STORIES 1 and 2 in the Story Repository (as shown in 630 and 631). Notably, in this example, Author C does not link to Story 3, because that story is not pertinent to Customer B and therefore it should not be included in Document 2.

In the exemplary embodiment, Story Repository (600) has two different types of links, "Owner" ("O") or "Copy" ("C"). As their names imply, the API (140) creates an "Owner" link when an author creates a text passage in a "Scratch Pad" and "promotes" that passage as a story in the repository. A "Copy" link is created when another author decides to use that same story in his/her document. In a further embodiment that will be explained below, when a "Copy" link is made, the author requesting a "Copy" link can specify whether to have a "Dynamic" or "Static" copy link.

Once a link (or pointer) is made, the linked story (whether it is a final or draft version) becomes included in a document for which the author is responsible for generating. The linked story can be seen on the screen of the author's client computer (110) via application 160 as being part of the author's document.

Continuing with the example in FIG. 6A, in addition to making a "Copy" link to both Story 1 (630) and Story 2 (631), the author(s) for Document 2 also generates his own story, Story 4 and receives an "Owner" link (601) into Section III of Document 2. After the author of Document 2 promotes Story 4 into the Story Repository, the author(s) of Document 3 determines that Story 4 would be useful for its customer, and therefore creates a "Copy" link into Document 3. Accordingly, as can be seen in FIG. 6A, the authors for Documents 2 and 3 generate some of their own stories (using their respective Scratch Pad GUI's in application 160) but also make "Copy" links to stories made by others. This is one example of how authors using the inventive system can collaborate to generate customized documents.

In addition to storing each story that has been promoted by an author, the Story Repository also stores metadata associated with each story. Metadata can include, for example, the name of the author (or "owner"), the document(s) to which the story is linked, the section in which it is linked in each document, the dates that the story was first created, "promoted," and/or published, the identification of any other users/co-authors/editors/proofers/etc. who accessed the story, whether editing has been completed, whether the story has been marked as locked, etc. For example, in FIG. 6B, Story 1 is associated with "Metadata 1" (650) in Story Repository (600).

Figure 6B:
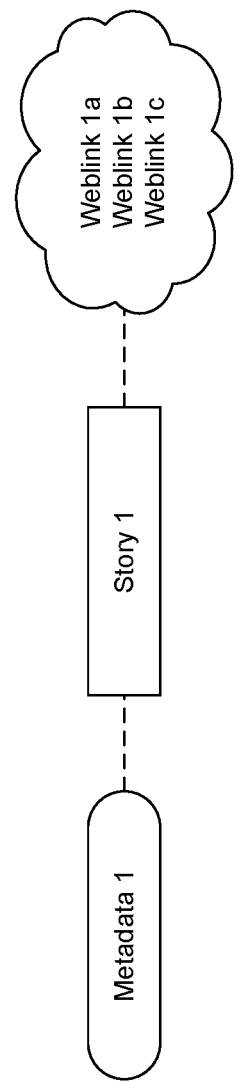
FIG. 6B is an exemplary diagram of links between a story, metadata and sources, generated in accordance with embodiments of the present invention.

In the example of a system for generating news briefings, at least some stories may be summaries of one or more news events described in online newspapers, periodicals, journals, search engines, blogs, social media (Twitter, Facebook, etc.) messages, etc. In FIG. 6B, the Story Repository also stores (at 660) the weblinks (hyperlinks) or sources from which the story has been derived. In a preferred embodiment, the hyperlinks are included within the story itself, so that a reader can click on the hyperlink to read the full version of the news event that is being briefed.

A sequence is now described by which the API (140) links an author of a document to existing stories that other authors have prepared for other documents. With further reference to FIGS. 1 and 6, the sequence describes steps that may be performed by the API (140) in response to input from, for example, Author C, to make a "Copy" (630) to Story 1 within Story Repository (600).

Upon request from Author C, client computer application 160 displays a graphical user interface (GUI), referred to as the "Find Stories Interface," enabling Author C to search for relevant stories that are not already in Document 2 and that have been prepared by other authors. The GUI prompts Author C to enter filter criteria for searching. For example, the filter can allow for text-string searches, searches by author name, date, etc. Referring to FIG. 6B, metadata (e.g., (650)) and/or the weblinks (e.g., (660)) may provide search criteria. In response to a prompt from the author, the client computer application 160 accesses the database (150) via API (140) over a network and then returns a listing of a filtered set of stories.

Author C can then opt to link to a selected story (such as Story 1). As will be explained below, the GUI may be configured to prompt the author to select either a "Static" or "Dynamic" link. In response to the input, API (140) adds the story to the document as a "Copy" link (and, if configured, whether the copy is "Static" or "Dynamic") and the story is added to the document tree for Document 2 (as illustrated in FIG. 4) and removed from result list for that document.

After a link is made, the author with the "Owner" link may continue inserting additional text or editing text in a story, and those changes may be made in the text being stored as the "story" in the database (150). Whether the changes that the "Owner" author is making will also flow through the "Copy" links to other documents depends upon whether a "Copy" link is "Dynamic" or "Static." As the name implies, a "Dynamic Copy" link is selected when an author wants any additional edits that the "Owner" author is making to be incorporated into the document for the "Copy" link. If an author does not want any subsequent changes made by the "Owner," then a "Static Copy" link is selected.

Figure 7:
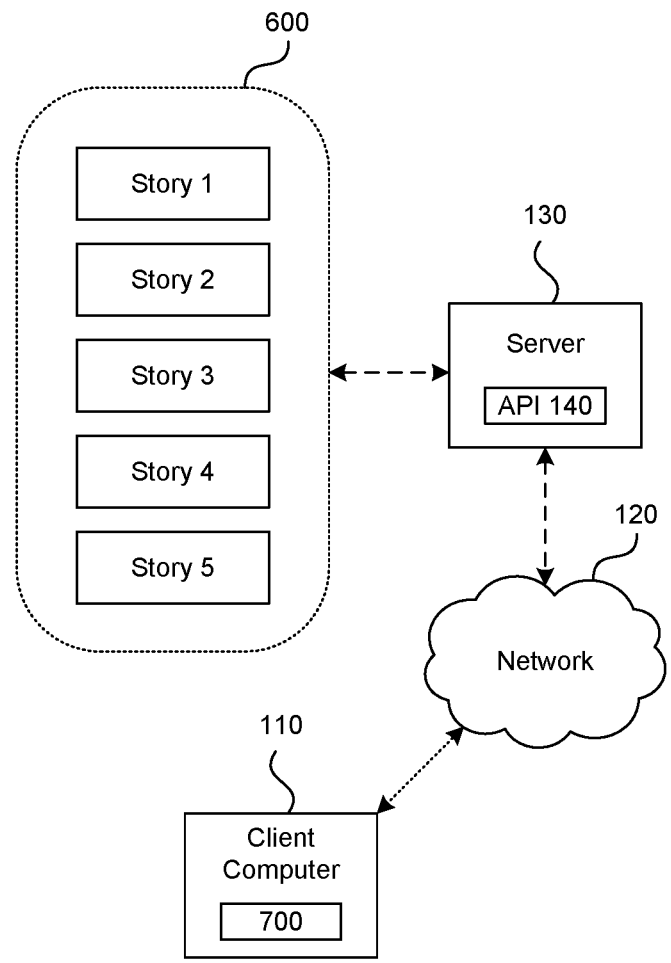
FIG. 7 is an exemplary diagram of infrastructure for enabling an editor to access stories in accordance with embodiments of the present invention.

In addition to any changes that the author having the "Owner" link might prepare, a copy editor can access any story stored in Story Repository (600) and prepare edits, which will be stored and will simultaneously appear on the screen for anyone's client computer (110) that is working on a document that is linked to that story. As depicted in FIG. 7, the copy editor can access all stories in the Story Repository (600) either via a certain user authentication or otherwise or using a specially-configured client application (700) that communicates with API (140) via the network.

A sequence is now described in which API (140) and client application 160 provide dynamic updates of a story within Story Repository (600) to documents in which an author elected to have a dynamic "copy" link. In this example, Author B continues to prepare edits to Story 2 via the client computer application 160. As these edits are received by API (140), the changes are sent to the server and stored in the database (150). API (140) updates the story, transmits a new revision number to the client computer (for Author B), and maintains the Owner link (621). In the meantime, periodically, the client computer application 160 for Author C will check for any changes to stories in the document (these can be asynchronous requests by client code). Via the server, API (140) will then return updated content for Story 2 via the dynamic "Copy" link for Document 2.

Although the systems and sequences described above can be quite useful when a story that an author has promoted is also usable for another author's document, there are many instances when the story would need to be modified and tailored to be appropriate for another author's document. In an exemplary embodiment, the API (140) and the Story Repository (600) is further configured to enable a second author to modify the story while still maintaining its affiliation with the originally-promoted story.

Figure 8:
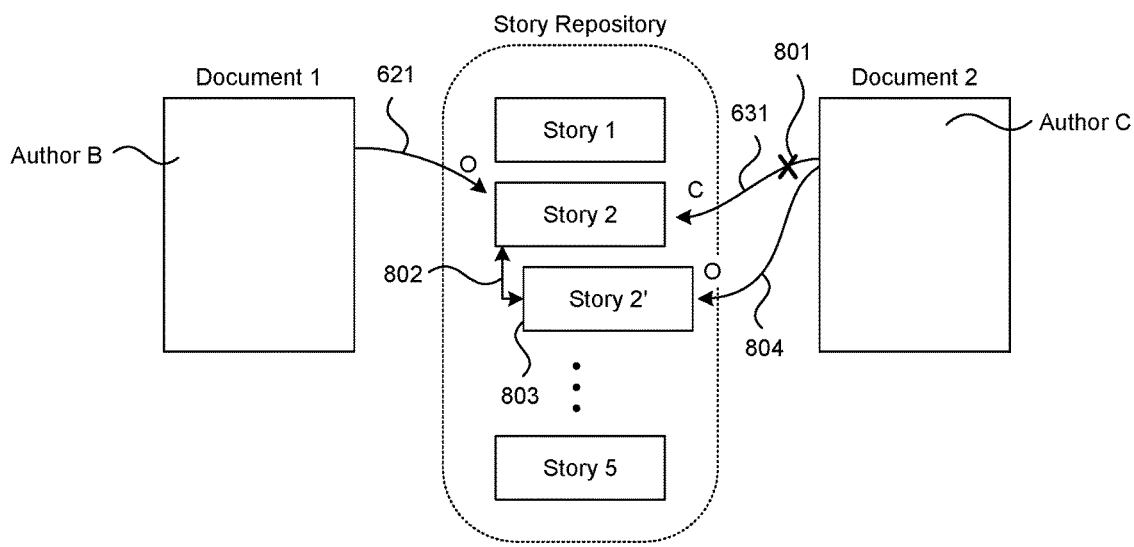
FIG. 8 is an exemplary diagram of a back-link between stories in accordance with embodiments of the present invention.

FIG. 8 is an exemplary block diagram of a back-link between text passages in accordance with embodiments of the present invention. In this example, Author C has decided to prepare edits to Story 2 so as to make the text passage more appropriate for its customer, Customer B, who will receive Document 2. The system is configured such that Author C can commence making changes to the text passage, and this will appear directly in Document 2. At the server side, the pointer that served as the "Copy" link from Document 2 to Story 2 (631) will be broken (see 801) and replaced with a new "Owner" link pointer (804) to Story 2' (803). API (140) then creates a back-link between Story 2 and Story 2' (802). The back-link is primarily included for auditing and tracking which text passage is the "original" and which one(s) is a modification of another author's work. In a preferred embodiment, at least some of the meta data and the weblinks that were associated with Story 2 are now also associated with Story 2'. Some of the meta data, such as the "status field" (whether the document is "locked" or not) are independent for each text passage, and therefore might be different.

In some embodiments, since "Copy" link (631) was broken, additional edits that Author B might make to Story 2 will not appear in Story 2'. This allows Author C to customize and finalize Story 2' without concern that Author C's edits might not be captured and included in the Story Repository (600). Likewise, breaking "Copy" link (631) allows Author B, which has an "Owner" link, to maintain control over the creation and publication of Story 2 (subject to edits made by the copy editor).

Figure 9:
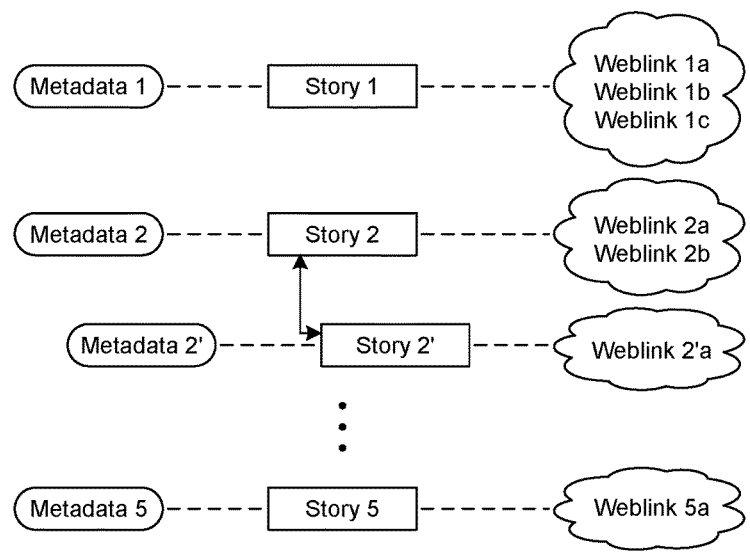
FIG. 9 is an exemplary diagram of links within a database between text passages, sources, and metadata, in accordance with embodiments of the present invention.

There are several reasons why it may be advantageous to maintain a back-link between an original story (Story 2) and modified version of that same story (Story 2'). As described above with reference to FIG. 6B, in one embodiment, each story is additionally associated in the Story Repository (600) with a set of sources (e.g., weblinks) for the information contained therein. Via the back-link (802), the hyperlinks are also automatically preserved for the modified story. This is depicted in FIG. 9. To the extent that the modified story references additional media that was not used in the original story, the modified story's separate hyperlinks are maintained as well.

In an additional embodiment, an author who has created a "Copy" link to a story and is preparing modifications to that story has the capability of at least proposing that those changes be made to the story that is being incorporated into all other documents, including the document which has an "Owner" link to the document. Often, when an author makes a "Copy" link to include a story in the author's document, that author determines that the story may need to be edited before it is included in that author's document to suit the customer's preferences. But on occasion, an author who made a "Copy" link may note that changes to the story should be made in all documents to correct a substantive inaccuracy or a grammatical error. In this embodiment, the client application (160) includes an icon, soft key, or other option can be provided for an author "emulate" a copy editor or an "owner" and make the changes to the story in all other documents, without breaking any links.

With further reference of FIGS. 1 and 8, another sequence is described, this time in which the API (140) responds to input from Author C and breaks (801) a "Copy" (631) to Story 2 from Story Repository (600). In this sequence, Author C uses client application 160 to "click on" (i.e., select to prepare edits to) Story 2, makes changes and exits, sending changes to the server to be stored through API (140) into database (150). API (140) detects that the link for Story 2 in Document 2 is a Copy and that Author C is not allowed (i.e., did not receive permission) to modify the "source" story. API (140) therefore creates Story 2' (2 "prime"), and changes the link for Document 2 from a Copy link for Story 2 to an Owner link for Story 2' (there is also a back-link from Story 2' to Story 2 to help with auditing). A new revision number (for Story 2') is sent to the client application (160). At that point, client application (160) updates the table of contents (TOC) for Document 2 to show the story is no longer linked (copy indicator icon is removed).

Via client application (160), the API (140) enables an author responsible for a document to designate that document as ready to be published. This causes stories that appear in that document to become "locked." That is, regardless of whether an author has created an "Owner" link or a "Copy" link to a story, the author will cause the story to become "locked" by indicating to the client application (160) that the document containing the story is ready for publication. In an exemplary embodiment, the client application (160) provides a visual indication that the document has been locked, and also within the API or Story Repository, the "Story Status" field within the metadata for the story itself is designated as "locked."

In some circumstances, the "link" between a story and a document can be broken by the original author, or "Owner." If the original author or an editor seeks to make any changes to a story after it has been "locked" then the "Owner's" link is broken and a new "Owner's" link is established. This is shown, for example, in FIG. 10A, where the Owner's link to Story 1 has been broken (1003) because another author had caused the story to become locked (1006) via his Copy link (1001). As a result, a new Story 1' is created in the repository (1002) and a new Owner link is created (1004). A back-link (1005) is then created between Story 1 and Story 1' for auditing purposes, so that there is a record of which story is original and which is modified.

Figure 10A:
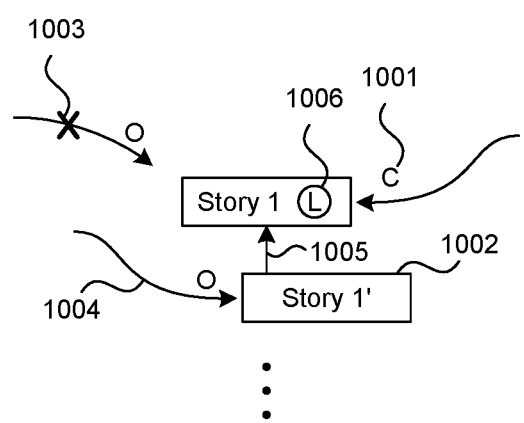
FIG. 10A is an exemplary diagram of links and a back link between versions of a story in accordance with embodiments of the present invention.

A sequence is now described for breaking an existing "Owner" link as depicted in FIG. 10A, resulting changes that an author with an "Owner" link makes to a story that either (i) also has a "Static" copy link or (ii) has been "locked." As described above, the "Owner" link was made by the original author of a story upon promoting the story into the Story Repository (600). Before any "Copy" links are made, the "Owner" link is maintained even as edits are made to the story by the original author. Likewise, if other authors make "Dynamic Copy" links to the story, the "Owner" link continues to be maintained even as the original author prepares additional edits. But, if a "Static Copy" link is made or the status of a copied story is changed to be "locked," then the "Owner" link from the original author is only maintained until the original author makes further edits. In that instance, the API (140) detects that there is at least one "Static Copy" or that the status of a copied story has been "locked." Since the story cannot be modified, the API (140) creates a new "Owner" link (as shown in FIG. 10A, from Story 1 to Story 1') and updates the link in Document 1 to reference Story 1'. In database (150), both Story 1 and Story 1' are stored as separate text passages, but the two text passages are linked by a back link.

Figure 10B:
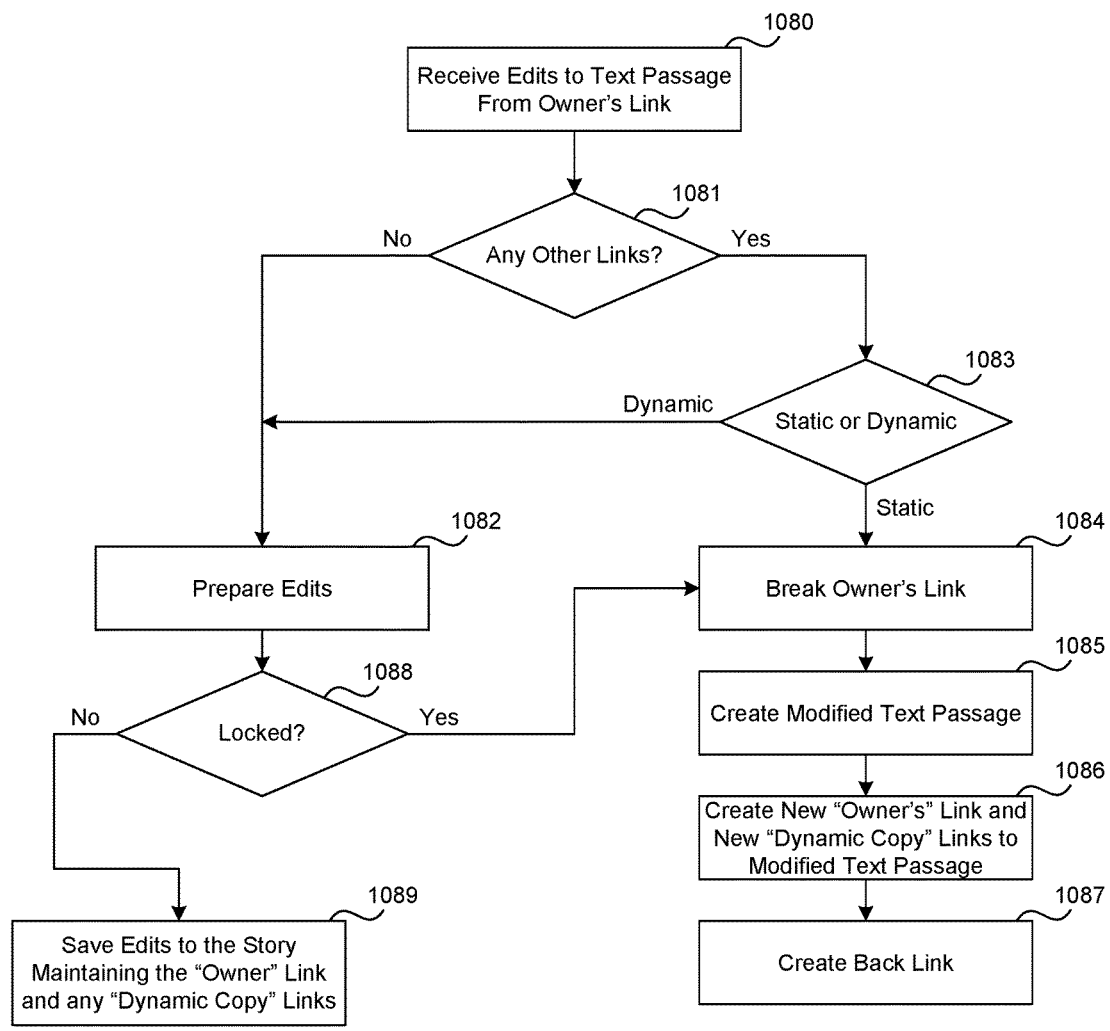
FIG. 10B is a flow diagram illustrating the modification of a text passage for an Owner's link and potential Copy links in accordance with embodiments of the present invention.

FIG. 10B illustrates an exemplary series of steps to be taken by the API when the author who generated a text passage (and has an "Owner" link) prepares further edits to the text passage. In step 1080, API (140) receives edits to the text passage over the "Owner" link. Accessing the Story Repository (600), the API 140 determines in step 1081 whether there are any other links to the text passage. If there are no other links, then in step 1082, the API prepares edits to the text passage. The API then checks in step 1088 whether the story status metadata field indicates that the story has been locked. If the story is not locked, then the Owner's link is maintained and the changes appear via the "Owner's" link in the author's document (and any other documents having a "Dynamic" link to the story) in step 1089. But if the story has been locked, then the "Owner's" link will be broken as will be described below.

If there are other links, then the API determines in step 1083 whether those links are Static or Dynamic. If the links are Dynamic, then the same path is followed as described above, referring to step 1082. If there is a Static Copy link, or if the story is "locked," then in 1084, the API breaks the Owner's link. A new text passage is created for the Story Repository (600) in step 1085. A new Owner's Link is created between the author's document and the new text passage and new Dynamic Copy links are created in step 1086. Finally, a back link is created in step 1087 between the new/modified text passage and the original text passage. In other embodiments, steps 1084-1087 can occur in any order.

Once an author of a document has completed all edits to all stories that are linked so as to be included in therein, the document itself is then finalized for distribution/publishing. Upon receiving an indication from the author, the API (140) "publishes" the document by first checking each story designated for inclusion and converting every "Dynamic Copy" link to a "Static Copy" link. As discussed above, this prevents any changes from happening after the author of the document desires to publish the document. The status field for the stories themselves are then marked as "Locked" in the metadata within the Story Repository and in the client application (160), the author is notified that the document and stories are locked. As mentioned above, if changes are made by an Owner of any story that has been locked, the link is then broken, as described above, to preserve the story in its present form for this document.

In each of the examples provided with reference to FIGS. 6-10, the links to stories in the story repository can be made in a manner that is not seen by the authors. From the authors' perspective, a search interface can be provided to search for stories, and once a story is selected, it appears to the author as if it has been incorporated into the author's document. Whether a new link is made or broken is not relevant to the author's experience, and therefore, it need not be presented. The use of the links and back-links enables the API to organize data storage and management within the Story Repository.

Figure 11:
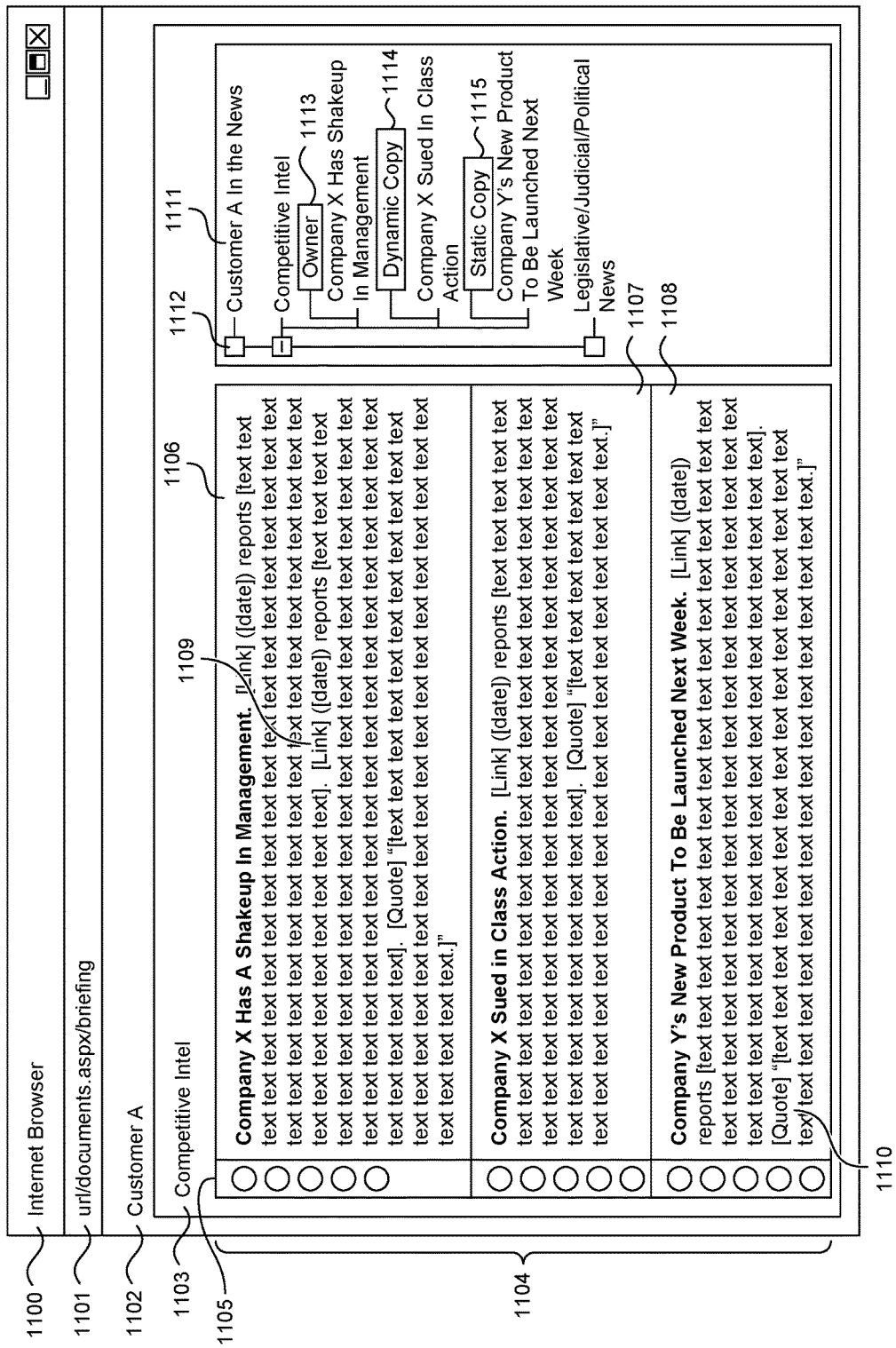
FIG. 11 is an exemplary diagram of a GUI for a client application for generating collaborative text passages for customized documentation in accordance with embodiments of the present invention.

FIG. 11 provides an exemplary graphical user interface (GUI) in client application (160), by which an author can create a document with stories that the author has personally written along with stories that have been copied, either verbatim or modified, from a story prepared by another author for another document. The GUI can run on known Internet browser software (1100), allowing for a relatively thin client application (160). The API can be accessed through the browser using a URL (1101).

The screen may identify customer/client (1102) for whom the document (although this is not necessary) is intended as well as the section (1103) of the document presently being displayed (although, in a scrolling mode, several sections could be displayed at once, for the reader to scroll through). The stories that the author has incorporated into the section (1103) of the document (1102) are illustrated in a separate work area (1104). Each story (1106-1108) has a title and text, which may additionally include hyperlinks (1109) and quotations from a news story (1110). For each story, a set of icons (1105) are provided to enable the user to take certain actions, such as "merge" (with another story), "set tags," "add/edit associated image," "have it proofed," "move" or "delete."

At a glance, the GUI also includes a "tree" view (1111) by which the author can view all of the sections for the document (1112) and, for the section selected for view, each of the story titles (text passage titles) within that section. For each story, an icon may be provided to indicate whether the story was (i) a "dynamic copy" (1114) from another author or (ii) a "static copy" (1115) from another author.

Accordingly, the present invention is directed to a system and method for facilitating collaboration between authors of different documents that include at least some of the same or similar text passages, using a centralized server and database and a technique for creating links between text passages and documents. The system and method provide advantages for accomplishing collaboration and simultaneous editing of text passages within different documents.

The foregoing description serves to explain the invention by way of example, but it should be understood that the invention is not limited to the exemplary embodiments described herein. For example, although the invention is described within the context of stories to be included in customized news briefings, or provisions within contractual documents, the invention is equally applicable to many other types of documentation, and particularly for use when multiple customized documents are being created that have at least some overlapping subject matter.

It will be apparent to those skilled in the art that various modifications and variations can be made in the system and method without departing form the spirit or scope of the invention. Thus, it is intended that the present invention cover the modifications and variations of this invention provided they come within the scope of the appended claims and their equivalents.

We claim:

1. A system for collaborative generation of a plurality of customized documents, each comprising a plurality of text passages, the system comprising:
   a server connected to a network for maintaining storage of the plurality of text passages in a repository; and
   at least one networked client computer in communication with the server and configured to receive user input from an author for generating a document and also for (i) generating new text passages and (ii) selecting already-generated text passages authored by others, wherein the new and selected text passages are to be included or modified for inclusion together in the document, and wherein the server is configured such that:
   when an author has generated a new text passage for a document, the server stores the new text passage in the repository and creates a link of a first type between the new text passage and the document wherein a link of the first type between a text passage and a document indicates that the document author is also the text passage author; and when an already-generated text passage is selected for a document, the server creates a link of a second type between the selected text passage and the document, wherein a link of the second type between a text passage and a document indicates that the document author is not the text passage author, and wherein:

(i) the link of the second type can be either a dynamic copy link, which propagates modifications made to the selected text passage by its author whose document has a link of a first type to the text passage, or a static copy link, which does not propagate any modifications made by others to the selected text passage; and (ii) upon receiving a selection to lock a document, the server converts any dynamic copy link to the document to a static copy link; and (iii) upon selecting an already-generated text passage authored by another, a document author is prompted to select whether the link of the second type is a dynamic link or static link.

2. The system of claim 1, further comprising a plurality of networked client computers in communication with the server via the network, wherein a subset of different client computers receive user input from a plurality of authors for generating a plurality of documents and for (i) generating new text passages and (ii) selecting already-generated text passages authored by others, wherein the new and selected text passages are to be included or modified for inclusion in the plurality of document.

3. The system of claim 1, wherein the server is further configured such that:

when a text passage is being modified for a first document having a link of a first type, and the text passage also has a static second type of link to a second document, the server
breaks the existing link of the first type,
stores a different text passage containing the text passage in its modified form, and
creates a link of the first type between the different text passage and the first document,
wherein the second document maintains the link to the original text passage without the modifications.

4. The system of claim 1, wherein the server is further configured such that:

when a text passage having a link of a first type to a first document is being modified for a second document having a link of the second type, the server:
breaks the existing link of the second type,
stores a different text passage containing the text passage in its modified form, and
creates a link of the first type between the second document and the different text passage,
wherein the first document maintains the link of the first type to the original text passage without the modifications.

5. The system of claim 1, wherein the repository stores metadata associating a text passage with the one or more documents to which the text passage is linked, and wherein the server is configured to generate a back link from the different text passage to the original text passage without modifications, and at least a portion of the metadata is made available for the different text passage through the back link.

6. The system of claim 1, wherein a document is divided into a plurality of sections, and the new and selected text passages are included into in respective sections of the document, and wherein the repository stores metadata indicating the section in which the text passage is inserted into the document.

7. The system of claim 1, wherein the customized documents are news briefings prepared for customers, and wherein the text passages are stories summarizing news events and a subset of which include hyperlinks to a full version of the news event being briefed.

8. A method for collaboratively generating a plurality of customized documents, each comprising a plurality of text passages, the method comprising:

maintaining storage of the plurality of text passages in a repository;

in response to user input to generate a new text passage, storing the new text passage in the repository and creating a link of a first type between an authored text passage and a document;

in response to user input to select an already-stored text passage, creating a link of a second type between the selected text passage and the document, wherein the link of the second type can be either a dynamic copy link, which propagates modifications made to the selected text passage by its author whose document has a link of a first type to the text passage, or a static copy link, which does not propagate modifications made by others to the selected passage; and in response to user input to lock a document, converting any dynamic copy link to the document to a static copy link, wherein a link of the first type between a text passage and a document indicates that the document author is also the text passage author, and a link of the second type between a text passage and a document indicates that the document author is not the text passage author, and wherein, upon selecting an already-generated text passage authored by another, a document author is prompted to select whether the link of the second type is a dynamic link or static link.

9. The method of claim 8, further comprising:

generating a plurality of different documents in response to user input from a plurality of users, wherein links of the second type are to text passages generated by different users for inclusion in different documents.

10. The method of claim 8, further comprising:

when a text passage is being modified for a first document having a link of a first type, modifying any second document having a dynamic copy link to the text passage, wherein the repository stores metadata associating the text passage with the first and second documents to which the text passage is linked.

11. The method of claim 8, further comprising:

when a text passage is being modified for a first document having a link of a first type, and the text passage also has a static second type of link to a second document,
breaking the existing link of the first type,
storing a different text passage containing the text passage in its modified form, and
creating a link of the first type between the different text passage and the first document,
wherein the second document maintains the link to the original text passage without the modifications.

12. The method of claim 8, further comprising:

when a text passage having a link of a first type to a first document is being modified for a second document having a link of the second type, breaking the existing link of the second type,
storing a different text passage containing the text passage in its modified form, and
creating a link of the first type between the second document and the different text passage,
wherein the first document maintains the link of the first type to the original text passage without the modifications.

13. The method of claim 12, wherein a text passage is associated with metadata indicating the one or more documents to which the text passage is linked, the method further comprising:
generating a back link from the different text passage to the original text passage, and
making the metadata available for the document linked to the different text passage.

14. The method of claim 8, further comprising:
generating a plurality of sections for the document in response to user input, wherein each new text passage and each selected text passage is specified by the user for inclusion in a respective section of the document, and
wherein a repository includes metadata indicating the section in which the text passage is inserted into the document.

15. The method of claim 8, wherein the customized documents are news briefings prepared for customers, and wherein the text passages are stories summarizing news events and at least a subset of text passages include hyperlinks to a full version of the news event being briefed.

16. A method for collaboratively generating a plurality of customized documents, each comprising a plurality of text passages, the method comprising:
receiving over a network text passages to be stored and linked for inclusion in documents being generated by respective authors;
for each text passage received, creating an owner link between the text passages and the corresponding documents being generated;
in response to user input, selecting stored text passages for which owner links have been created and creating copy links between the selected text passages and the corresponding documents being generated, and
in response to an owner modifying a text passage having a link of a first type, linking the modified text passage to any documents having a link of a first type or a dynamic copy link, wherein any dynamic copy link to a document is converted to a static copy link, which does not propagate any modifications made by others to the selected text passage, when the document is finalized,
wherein a link of the first type between a text passage and a document indicates that the document author is also the text passage author, and a link of the second type between a text passage and a document indicates that the document author is not the text passage author, and
wherein, upon selecting an already-generated text passage authored by another, a document author is prompted to select whether the link of the second type is a dynamic link or static link.

17. The method of claim 16, further comprising:
when edits to a text passage are received via the owner link, propagating the edits to documents having a copy link to the text passage, if the copy link is a dynamic link.

18. The method of claim 16, further comprising:
when edits to a text passage are received from a user and metadata associated with the text passage indicates that the status of the text passage is locked, incorporating the edits into a modified text passage, and creating a new owner link between the modified text passage and the document being authored by the user that prepared the edits, wherein the modified text passage associated with metadata associating the modified text passage with the document being authored by the user that prepared the edits.

19. The method of claim 16, further comprising:
in response to search criteria provided by user input, generating a listing of stored text passages that correspond with provided search criteria;
receiving a user's selection of (i) a stored text passage to be incorporated into a document being authored by the user, and (ii) whether to generate a dynamic or a static link.

* * * * *